(12) United States Patent
Nagai et al.

(10) Patent No.: US 6,210,848 B1
(45) Date of Patent: Apr. 3, 2001

(54) ELECTROPHOTOGRAPHIC PHOTOCONDUCTOR, AND PROCESS CARTRIDGE AND IMAGE FORMING APPARATUS USING THE SAME

(75) Inventors: Kazukiyo Nagai; Tetsuro Suzuki; Masaomi Sasaki; Kohkoku Ri; Shinichi Kawamura, all of Shizuoka (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/560,569

(22) Filed: Apr. 28, 2000

(30) Foreign Application Priority Data

Apr. 30, 1999 (JP) .................................................. 11-124415
Mar. 31, 2000 (JP) .................................................. 12-097520

(51) Int. Cl.[7] ............................. G03G 5/047; G03G 15/22
(52) U.S. Cl. .................... 430/58.7; 430/58.05; 430/59.4; 430/59.5; 399/159
(58) Field of Search ............................. 430/58.05, 58.7, 430/59.4, 59.5; 399/159

(56) References Cited

U.S. PATENT DOCUMENTS

| | | | |
|---|---|---|---|
| 5,246,807 | * 9/1993 | Kanemaru et al. | 430/59.5 |
| 5,294,509 | * 3/1994 | Ashiya et al. | 430/58.05 |
| 5,370,954 | 12/1994 | Ohta et al. | 430/70 |
| 5,457,232 | 10/1995 | Tanaka et al. | 564/426 |
| 5,459,275 | 10/1995 | Tanaka et al. | 548/145 |
| 5,492,784 | 2/1996 | Yoshikawa | 430/56 |
| 5,576,132 | 11/1996 | Tanaka et al. | 430/71 |
| 5,578,405 | 11/1996 | Ikegami et al. | 430/76 |
| 5,599,995 | 2/1997 | Tanaka et al. | 564/426 |
| 5,604,065 | 2/1997 | Shimada et al. | 430/83 |
| 5,672,728 | 9/1997 | Tanaka et al. | 558/376 |
| 5,672,756 | 9/1997 | Shimada et al. | 564/426 |
| 5,677,094 | * 10/1997 | Umeda et al. | 430/58.05 |
| 5,840,454 | * 11/1998 | Nagai et al. | 430/58.7 |
| 5,853,935 | 12/1998 | Suzuki et al. | 430/83 |
| 5,871,876 | 2/1999 | Ikuno et al. | 430/58.7 |
| 5,942,363 | 8/1999 | Tanaka et al. | 430/75 |
| 5,981,124 | 11/1999 | Shimada et al. | 430/56 |
| 6,027,846 | * 2/2000 | Shimada et al. | 430/58.7 |
| 6,030,733 | 12/1998 | Kami et al. | 430/58.7 |
| 6,045,959 | * 4/2000 | Katayama et al. | 430/58.7 |
| 6,066,428 | * 5/2000 | Katayama et al. | 430/58.7 |
| 6,093,784 | 7/2000 | Tamura et al. | 528/196 |
| 6,103,435 | 8/2000 | Shimada et al. | 430/56 |

* cited by examiner

Primary Examiner—Roland Martin
(74) Attorney, Agent, or Firm—Oblon, Spivak, McClelland, Maier & Neustadt, P.C.

(57) ABSTRACT

An electrophotographic photoconductor has an electroconductive support and a photoconductive layer formed thereon, a surface top portion of the photoconductor containing a high-molecular charge transport material including a polycarbonate copolymer synthesized from (a) a bisphenol monomer with an ionization potential of 6.0 eV or less, having a positive hole transporting function, and (b) a bisphenol monomer having a substituent at the o-position with respect to at least one hydroxyl group thereof, the substituent being bulkier than a fluorine atom. A process cartridge holds the above-mentioned photoconductor therein, and an electrophotographic image forming apparatus is provided with the above-mentioned photoconductor or process cartridge.

26 Claims, 2 Drawing Sheets

ELECTROPHOTOGRAPHIC PHOTOCONDUCTOR, AND PROCESS CARTRIDGE AND IMAGE FORMING APPARATUS USING THE SAME

BACKGROUND OF THE INVENTION

1. Field of the Invention

The present invention relates to an electrophotographic photoconductor for use in a printer, a copying machine, and a facsimile machine, and in particular to an electrophotographic photoconductor comprising an electroconductive support and a photoconductive layer formed thereon, with the top surface layer of the photoconductor containing a specific high-molecular charge transport material to minimize the wear of the photoconductor and improve the chemical stability to oxidized material generated in the above-mentioned electrophotographic apparatus.

2. Discussion of Background

According to the electrophotographic image forming method employing the Carlson process, the surface of a photoconductor is uniformly charged, and exposed to light images, thereby forming latent electrostatic images on the surface of the photoconductor. The latent electrostatic images thus formed are developed to visible toner images with a toner, and the toner images are transferred to an image receiving member such as a sheet of paper, and fixed thereon. After the toner images are transferred to the image receiving member, residual toner remaining on the surface of the photoconductor is removed therefrom, and the photoconductor is subjected to quenching step. Thus, the photoconductor can be repeatedly used for an extended period of time.

The electrophotographic photoconductor is required to have basic electrophotographic properties such as stable charging characteristics and good sensitivity, and minimal dark decay. In addition to the above, the photoconductor is further required to have satisfactory physical properties from the viewpoints of printing resistance, wear resistance, and moisture resistance. Further, it is important for the photoconductor to exhibit an environmental resistance, to be more specific, the resistance to ozone generated in the course of corona charging, and the resistance to ultraviolet light in the course of light exposure.

In recent years, for achieving color image formation, a plurality of photoconductors is incorporated in an electrophotographic machine such as a copying machine, printer, and facsimile machine. Further, in line with the trend toward small-size apparatus, there is a tendency to decrease the diameter of the photoconductor. However, the smaller the diameter of the photoconductor, the more conspicuous the abrasion of the photoconductor even though the printing operation is repeated the same number of times. The result is that the charging characteristics of the photoconductor are decreased and the life of the photoconductor is thus curtailed. It is conventionally inevitable to replace such a photoconductor or a developing unit including the photoconductor that is no longer used. To extend the life of the photoconductor itself as long as possible is desirable from the environmental viewpoint.

One of the typical examples of the photoconductors which are put in practical use is an organic photoconductor having such a layered structure that a charge generation layer (CGL) and a charge transport layer (CTL) are successively overlaid on an electroconductive support.

The charge transport layer (CTL) comprises a binder resin and a low-molecular charge transport material (CTM). In this case, the low-molecular charge transport material is usually contained in the charge transport layer in an amount of as large as 40 to 50 wt. % in order to exhibit sufficient charge transporting properties. The addition of such a large amount of low-molecular charge transport material (CTM) lowers the intrinsic mechanical strength of the binder resin employed for the charge transport layer. Such lowering of the mechanical strength of the charge transport layer will decrease the wear resistance of the obtained photoconductor.

To solve the above-mentioned problem, a variety of binder resins with excellent mechanical strength have been developed. However, the amount of the low-molecular charge transport material contained in the charge transport layer is so large that the binder resin cannot exhibit its own properties sufficiently.

It is thus proposed to use a high-molecular charge transport material with excellent mechanical characteristics instead of the aforementioned low-molecular charge transport material.

Some vinyl polymers such as polyvinyl anthracene, polyvinyl pyrene and poly-N-vinylcarbazole have been studied as the high-molecular charge transport materials for the organic photoconductor of a charge transport complex type. However, such vinyl polymers are not satisfactory from the viewpoint of photosensitivity.

In addition, high-molecular materials with charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any of these materials have not yet been put to practical use because of the low sensitivity or high residual potential.

The development of high-molecular charge transport materials has been proceeding. Some are found to provide a photoconductor with a sufficient sensitivity and a low residual potential as disclosed in Japanese Laid-Open Patent Applications 7-325409, 9-127713, 9-297419, 9-80783, 9-80784, 9-80172, 9-222740, 9-265197, 9-295201, 9-211877, 9-304956, 9-304957, and 9-329907. The wear resistance of these photoconductors is improved when compared with that of the conventional photoconductors, so that the life of the photoconductors can be extended to some extent.

However, another factor to shorten the life of the photoconductor is the deterioration of charging characteristics resulting from the exposure of the photoconductor to ozone and NOx gases. Most of electrophotographic image forming apparatus employ a corona charger at the charging step. In the course of the charging step, ozone gas generated from the corona charger and nitrogen compound gas (NOx) synthesized from the ozone and nitrogen in the air are brought into contact with the surface of the photoconductor, thereby causing the charging characteristics of the photoconductor to deteriorate during the repeated use. To eliminate the above-mentioned problem, the contact charging method, for example, using a charging roller currently becomes prevalent instead of the corona charging method for reducing the generation of oxidized gases. Although the amount of ozone and the reactive gases can be reduced by the contact charging method, the problem of adverse effect on the photoconductor by such reactive gases has not yet been solved. The decrease in charging characteristics due to the exposure of the photoconductor to the reactive gases will become a significant factor to determine the life of the photoconductor as the wear resistance of the photoconductor is increasing. In other words, there remains the problem that the life of the photoconductor cannot be extended in spite of the improvement in wear resistance because insufficient gas resistance lowers the charging characteristics.

To improve the resistance of the photoconductor to such oxidized gases, addition of a hindered phenol or p-phenylenediamine, which is known as an antioxidant for the conventional photoconductors, is disclosed in Japanese Laid-Open Patent Applications 63-18356, 63-50849, and 63-44662. Such a method of adding the antioxidant to the photoconductor can be applied to the previously mentioned organic photoconductor comprising a high-molecular charge transport material. In this case, however, it is preferable to minimize the amount of antioxidant. This is because the wear resistance of the photoconductor is lowered by the addition of a large amount of antioxidant. In view of the above-mentioned fact, it is considered that when the high-molecular charge transport material itself has sufficient gas resistance, the best results can be produced.

However, no attention has been paid to the gas resistance of the employed high-molecular charge transport material in the development of photoconductors employing the high-molecular charge transport materials.

Japanese Laid-Open Patent Application 9-297419 discloses a photoconductor which comprises a polycarbonate copolymer resin having an aromatic tertiary amine structure or a triarylamine structure, with the aim to improve the wear resistance of the photoconductor. No consideration is given to the gas resistance of the photoconductor in this application, so that the life of the photoconductor cannot be extended in terms of the gas resistance.

SUMMARY OF THE INVENTION

Accordingly, it is a first object of the present invention to provide a photoconductor with sufficient durability and a long life in terms of both the wear resistance and the gas resistance by employing a high-molecular charge transport material, and therefore capable of producing images with minimum deterioration even after repeated operations.

To be more specific, the conventional electrophotographic photoconductors of which the surface top layer comprises a high-molecular charge transport material have been acceptable for practical use with respect to the charging characteristics, sensitivity, and residual potential. However, there is not found any means for effectively improving the durability of the photoconductor, particularly, in terms of the resistance to oxidized gases generated in the electrophotographic image forming apparatus. Therefore, the first object of the present invention is to provide a photoconductor which has such a high resistance to oxidized gas as to fully extend the life of the photoconductor.

A second object of the present invention is to provide a process cartridge comprising the above-mentioned electrophotographic photoconductor.

A third object of the present invention is to provide an electrophotographic image forming apparatus employing the above-mentioned photoconductor.

The above-mentioned first object of the present invention can be achieved by an electrophotographic photoconductor comprising an electroconductive support and a photoconductive layer formed thereon, a surface top portion of the photoconductor comprising a high-molecular charge transport material which comprises a polycarbonate copolymer synthesized from (a) a bisphenol monomer with an ionization potential of 6.0 eV or less, having a positive hole transporting function, and (b) a bisphenol monomer comprising a substituent at the opposition with respect to at least one hydroxyl group thereof, the substituent being bulkier than a fluorine atom.

Alternatively, the first object of the present invention can also be achieved by an electrophotographic photoconductor comprising an electroconductive support and a photoconductive layer formed thereon, a surface top portion of the photoconductor comprising a high-molecular charge transport material which comprises a polycarbonate copolymer synthesized from (a) a bisphenol monomer with an ionization potential of 6.0 eV or less, having a positive hole transporting function, and (c) a bisphenol monomer of the following formula (1):

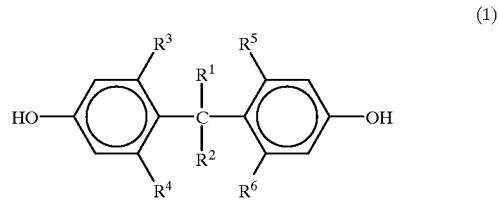

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

The second object of the present invention can be achieved by a process cartridge which is freely attachable to an electrophotographic image forming apparatus and detachable therefrom, comprising the above-mentioned electrophotographic photoconductor, and at least one means selected from the group consisting of a charging means, an image exposure means, a developing means, an image transfer means, and a cleaning means.

The third object of the present invention can be achieved by an electrophotographic image forming apparatus comprising the above-mentioned photoconductor.

The third object of the present invention can also be achieved by an electrophotographic image forming apparatus comprising the above-mentioned process cartridge holding the photoconductor therein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
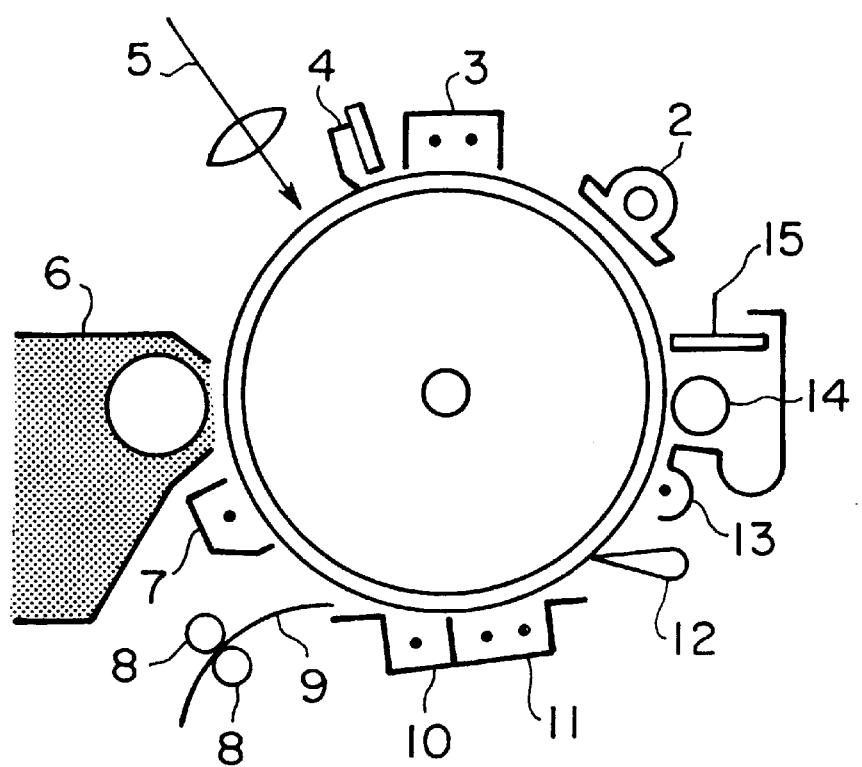
FIG. 1 is a schematic view which shows an example of an electrophotographic image forming apparatus according to the present invention.

An electrophotographic photoconductor according to the present invention comprises an electroconductive support and a photoconductive layer formed thereon, a surface top portion of the photoconductor comprising a high-molecular charge transport material which comprises a polycarbonate copolymer. The above-mentioned polycarbonate is synthesized from (a) a bisphenol monomer with an ionization potential of 6.0 eV or less, having a positive hole transporting function, and (b) a bisphenol monomer comprising a substituent at the o-position with respect to at least one hydroxyl group thereof, the substituent being bulkier than a fluorine atom.

The above-mentioned polycarbonate resin can also be obtained by the method of synthesizing conventional polycarbonate resins, that is, polymerization of a bisphenol and a carbonic acid derivative.

To be more specific, the polycarbonate resin for use in the present invention can be produced by the ester interchange between at least one kind of diol and a bisarylcarbonate compound, or by the polymerization of a diol with a halogenated carbonyl compound such as phosgene in accordance with solution polymerization or interfacial polymerization, or by the polymerization of the dial with a chloroformate such as bischloroformate derived from the diol. Such conventional synthesis methods are described in the reference, for example, "Handbook of Polycarbonate Resin" (issued by The Nikkan Kogyo Shimbun Ltd.).

Since the high-molecular charge transport material is employed in the photoconductor according to the present invention, the increase of mechanical wear can be more effectively prevented when compared with the case where a low-molecular charge transport material is dispersed in the photoconductive layer. Therefore, the photoconductor of the present invention can exhibit excellent wear resistance.

Furthermore, the practical electrophotographic characteristics of the photoconductor according to the present invention are satisfactory. This is because the bisphenol monomer (a) having an ionization potential of 6.0 eV or less and the positive hole transporting function is contained in the copolymer resin in a high concentration.

In addition to the above, the gas resistance of the photoconductor can be improved owing to the bisphenol monomer (b) comprising a substituent at the o-position with respect to at least one hydroxyl group thereof, the substituent being bulkier than a fluorine atom.

In the electrophotographic image forming apparatus, the photoconductor is exposed to oxidized gases such as ozone and NOx, and nitric acid compounds resulting from the above-mentioned oxidized gases. Those materials are not only deposited on the surface of the photoconductive layer, but also diffused in the photoconductive layer to react with a charge generation material or to be adsorbed thereby. The result is that the charging characteristics are lowered. In the conventional charge transport layer comprising a binder polymer and a low-molecular charge transport material dispersed therein, some gaps present in the chain of the binder polymer are filled with the low-molecular charge transport material just like as a filler. The permeation of the oxidized gases through the above-mentioned charge transport layer can be therefore prevented to some extent. In contrast to this, when the high-molecular charge transport material is employed in the charge transport layer, the gas permeability of the charge transport layer is considered to be increased because the structure of the high-molecular charge transport material is bulkier than the above-mentioned binder polymer.

In general, a stilbene structure or benzidine structure is used as the structural unit with an ionization potential of 6.0 eV or less and the positive hole transporting function. In this case, such a structural unit becomes bulkier than a bisphenol structure which is commonly used for a polycarbonate. When the above-mentioned structural unit is connected, the packing performance becomes poor in the photoconductive layer, so that the reactive gases easily penetrate into the inside of the photoconductor.

To compensate the poor packing performance, the substituent which is bulkier than a fluorine atom is considered to effectively work when put at the opposition with respect to at least one carbonate group of the obtained polycarbonate for use in the present invention. The oxidized mterials sucha as ozone and NOx gases have strong polarity so that the compatibility of the oxidized materials with the carbonate group is considered to be high. Therefore, diffusion of the oxidized materials in the photoconductive layer can be prevented very effectively due to the substituent which is capable of concealing the carbonate group from the oxidized materials.

The bisphenol monomer (a) with an ionization potential of 6.0 eV or less, having a positive hole transporting function will now be explained in detail.

By the application of a large electric field, the injected electric charge, which is a positive hole or an electron, is more or less transported in most of the organic compounds. It is not unconditionally determined whether the compound has a positive hole transporting function or not. In the present invention, it is specified by the ionization potential of a material whether the material has the positive hole transporting function or not. The high-molecular charge transport material for use in the present invention has a polycarbonate structure, and the positive hole transporting properties of the polycarbonate structure result from the hopping conduction of a structural unit having a positive hole transporting function. The hopping conduction is carried out in such a manner that the positive hole is transported by repeated reduction and oxidation of a radical cation. It is conventionally known that the structural unit capable of carrying out the hopping conduction has a structure of the conventional low-molecular positive hole transporting materials of electron donor type, of which ionization potentials are known as 6.0 eV or less.

If the ionization potential of the bisphenol monomer (a) having the positive hole transporting function is more than 6.0 eV, heat of formation of the radical cation is increased to elevate the energy level for the hopping conduction. Accordingly, the positive hole transporting function cannot be properly exhibited. In addition, the ionization potentials of charge generation materials usually employed in the organic photoconductors are in the range of 5 to 6 eV. It is preferable that the ionization potential of the charge transport material be smaller than that of the charge generation material when the injection of positive hole from the charge generation layer to the charge transport layer is taken into consideration. Therefore, in the present invention the ionization potential of the bisphenol monomer (a) having a positive hole transporting function is specified as 6.0 eV or less in terms of the positive hole injection performance.

It is preferable that the ionization potential of the bisphenol monomer (a) be in the range of 5.0 to 5.7 eV. When the ionization potential is 5.7 or less, the energy level for the positive hole to inject from the charge generation layer to the charge transport layer is more appropriate. Accordingly, the increase in residual potential and the decrease in photosensitivity can be prevented in the repeated operations. When the ionization potential of the bisphenol monomer (a) is 5.0 eV or more, the bisphenol monomer (a) is scarcely oxidized, and becomes unsusceptible to the oxidized gases such as ozone and Nox gases, so that the properties of the obtained photoconductor can be stabilized.

It is more preferable that the ionization potential of the bisphenol monomer (a) be in the range of 5.2 to 5.6 eV. There are conventionally known phthalocyanine pigments such as oxotitanium phthalocyanine and bisazo pigments as the charge generation materials capable of showing high sensitivity. The ionization potentials of those charge generation materials are in the range of 5.2 to 5.6 eV. When the high-molecular charge transport material for use in the present invention is used in combination with the above-mentioned charge generation materials, it is advantageous from the viewpoints of residual potential and sensitivity that the ionization potential of the charge transport material is smaller than 5.6 eV. The above-mentioned charge generation materials are very sensitive to the oxidized gases such as NOx gases, and the charging characteristics are easily lowered when the charge generation materials are exposed to such oxidized gases. In light of this point, the charge transport material which is used in combination with the phthalocyanine pigment and azo pigment with high sensitivity may have high oxidation resistance, and an Ionization potential of 5.2 eV or more.

According to the present invention, a polycarbonate copolymer synthesized from the bisphenol monomer (a) and a bisphenol (c) of the following formula (1) is also used as the high-molecular charge transport material:

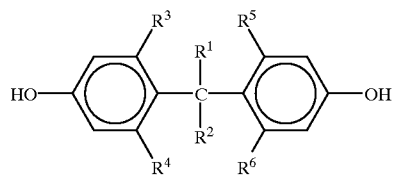

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

In this case, the alkylidene group of the alkylidenebisphenol structure is made of a long-chain alkylidene group having 4 or more carbon atoms as shown in formula (1). The space of the obtained high-molecular charge transport material is packed with such a long-chain alkylidene group. Thus, the photoconductor which employs such a high-molecular charge transport material can show the improved gas resistance.

In the alkylidene moiety of the above-mentioned formula (1), it is preferable that the total number of carbon atoms of $R^1$ and $R^2$ be in a range of 4 to 36. By using such a polycarbonate copolymer as the high-molecular charge transport material, there can be obtained a photoconductor with high mechanical wear resistance, and high gas resistance. In particular, the decrease of charging characteristics can be minimized even though the photoconductor is exposed to NOx gases. When the aforementioned total number of carbon atoms of $R^1$ and $R^2$ is less than 4, the resistance to NOx gases is lowered; and when the total number of carbon atoms is more than 36, the mechanical wear resistance is decreased.

The previously mentioned bisphenol monomer (b) may have the following formula (2):

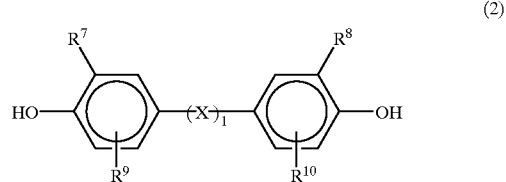

(2)

wherein $R^7$, $R^8$, $R^9$, and $R^{10}$ are each a hydrogen atom, a chlorine atom, a bromine atom, a straight-chain or branched alkyl group having 1 to 6 carbon atoms, a cyclic alkyl group having 5 to 7 carbon atoms, or phenyl group, provided that $R^7$ and $R^8$ are not a hydrogen atom at the same time; and is an integer of 0 or 1, and when l=1, X is a straight-chain alkylene group having 2 to 12 carbon atoms, a branched alkylene group having 3 to 12 carbon atoms, a bivalent group having at least one alkylene group with 1 to 10 carbon atoms and at least one atom selected from the group consisting of oxygen atom and sulfur atom, —O—, —S—, —SO—, —SO$_2$—, —CO—,

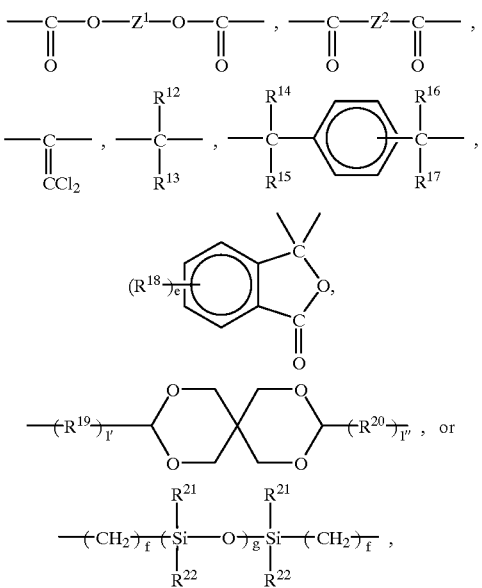

in which $Z^1$ and $Z^2$ are each a substituted or unsubstituted bivalent aliphatic group, or a substituted or unsubstituted arylene group; $R^{12}$, $R^{13}$, $R^{14}$, $R^{15}$, $R^{16}$, $R^{17}$ and $R^{18}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^{12}$ and $R^{13}$ may form together a carbon ring or heterocyclic ring having 5 to 12 carbon atoms, or $R^{12}$ and $R^{13}$ may form a carbon ring or heterocyclic ring in combination with $R^8$ and $R^9$; l' and l" are each an integer of 0 or 1, and when l'=1 and l"=1, $R^{19}$ and $R^{20}$ are each an alkylene group having 1 to 4 carbon atoms; $R^{21}$ and $R^{22}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

The aforementioned formula (2) shows preferable specific examples of the bisphenol monomer (b) having a substituent which is bulkier than a fluorine atom at the o-position with respect to at least one hydroxyl group.

As mentioned in the description of formula (2), X may represent a bivalent group having at least one alkylene group with 1 to 10 carbon atoms and at least one atom selected from the group consisting of oxygen atom and sulfur atom.

Specific examples of the above-mentioned bivalent group represented by X are as follows:

$OCH_2CH_2O$
$OCH_2CH_2OCH_2CH_2O$
$OCH_2CH_2OCH_2CH_2OCH_2CH_2O$
$OCH_2CH_2CH_2O$
$OCH_2CH_2CH_2CH_2O$
$OCH_2CH_2CH_2CH_2CH_2CH_2O$
$OCH_2CH_2CH_2CH_2CH_2CH_2CH_2CH_2O$
$CH_2O$
$CH_2CH_2O$
$CHE_tOCHE_t$
$CHCH_3O$
$SCH_2OCH_2S$
$CH_2OCH_2$
$OCH_2OCH_2O$
$SCH_2CH_2OCH_2OCH_2CH_2S$
$OCH_2CHCH_3OCH_2CHCH_3O$
$SCH_2S$
$SCH_2CH_2S$
$SCH_2CH_2CH_2S$
$SCH_2CH_2CH_2CH_2S$
$SCH_2CH_2CH_2CH_2CH_2CH_2S$
$SCH_2CH_2SCH_2CH_2S$, and
$SCH_2CH_2OCH_2CH_2OCH_2CH_2S$ In the aforementioned formula (2), it is preferable that $R^7$ and $R^8$ be each a straight-chain or branched alkyl group having 3 to 6 carbon atoms, a cyclic alkyl group having 5 to 7 carbon atoms, or phenyl group. In this case, the gas resistance of the obtained photoconductor can be effectively improved. In particular, the decrease in charging characteristics can be minimized even when the photoconductor is exposed to NOx gases. Further, there can be obtained a photoconductor with excellent mechanical wear resistance. For instance, if $R^7$ and $R^8$ are each a straight-chain or branched alkyl group having carbon atoms less than 3, the resistance to NOx gases becomes low. On the other hand, when the straight-chain or branched alkyl group has more than 6 carbon atoms, or the cyclic alkyl group has more than 7 carbon atoms, the mechanical wear resistance becomes low.

When X in the formula (2) is ethylene group, the same advantages as mentioned above can be obtained. The wear resistance and the gas resistance of the obtained photoconductor are remarkably improved by employing such a specific connecting portion as ethylene group, and placing a substituent that is bulkier than fluorine atom at the o-position with respect to at least one hydroxyl group in formula (2).

Furthermore, it is preferable that the bisphenol monomer (b) have the following formula (3):

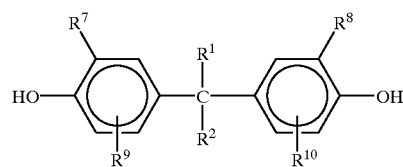

(3)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^7$, $R^8$, $R^9$, and $R^{10}$ are each a hydrogen atom, a chlorine atom, a bromine atom, a straight-chain or branched alkyl group having 1 to 6 carbon atoms, a cyclic alkyl group having 5 to 7 carbon atoms, or phenyl group, provided that $R^7$ and $R^8$ are not a hydrogen atom at the same time.

In this case, the obtained high-molecular charge transport material is provided with improved gas resistance.

As mentioned in the explanation of the formula (1), it is preferable that the total number of carbon atoms of $R^1$ and $R^2$ be in a range of 4 to 36 in the above-mentioned formula (3) when the resistance to NOx gases and the mechanical wear resistance of the photoconductor are taken into consideration.

In the present invention, it is preferable that the bisphenol monomer (a) have an aromatic tertiary amine structure, in particular, a triarylamine structure.

In the electrophotographic photoconductor according to the present invention, it is preferable that the photoconductive layer comprise a charge generation layer and a charge transport layer which are successively overlaid on the electroconductive support in this order. In such a case, the high-molecular charge transport material, that is, the above-mentioned polycarbonate copolymer is contained in the charge transport layer. Similar to the conventional photoconductor in which a low-molecular material is dispersed, the above-mentioned function-separating photoconductor can be provided with high sensitivity and excellent stability by using the polycarbonate copolymer for use in the present invention.

Other layers may be provided in the above-mentioned photoconductor in the same manner as in the conventional photoconductor. For instance, an intermediate layer may be interposed between the electroconductive support and the photoconductive layer. Other materials for use in each layer are the same as those in the conventional photoconductors.

When the charge generation layer of the photoconductor according to the present invention comprises a charge generation material which comprises a phthalocyanine pigment, in particular, oxotitanium phthalocyanine, or an azo pigment, the sensitivity of the photoconductor can be further improved.

When the azo pigment is used as the charge generation material in the charge generation layer, it is further preferable that the charge generation layer comprise the azo pigment and a binder resin in an amount of 10 wt. % or less of the entire weight of the charge generation layer.

As mentioned above, when the phthalocyanine pigment or azo pigment is used as the charge generation material in combination with the high-molecular charge transport material for use in the present invention, the sensitivity of the obtained photoconductor can be remarkably improved. The reason for this is as follows:

For example, when an azo pigment is used as the charge generation material in the layered photoconductor comprising a low-molecular donor material, the carrier generation mechanism is found to be based on an electron transporting reaction between the azo pigment particle and the low-molecular donor material adjacent thereto. Therefore, it is theoretically necessary that the azo pigment particles be fully in contact with the low-molecular donor material for achieving effective charge generation. In the conventional photoconductor of the low-molecular material dispersed type, there is much chance of the low-molecular donor material penetrating into the charge generation layer in the course of film formation of the charge transport layer by coating. As a result, the low-molecular donor material can fully come in contact with the charge generation material. In contrast to the above, in the charge transport layer employing the high-molecular charge transport material as in the present invention, penetration of the high-molecular charge transport material into the charge generation layer cannot be expected in the course of the film formation of the charge transport layer. The result is that the charge generation material such as an azo pigment cannot come in contact with the donor structural unit sufficiently. This will lower the charge generation efficiency, and consequently, decrease the sensitivity of the photoconductor.

In the present invention, therefore, it is recommended that when the azo pigment is used as a charge generation material in a charge generation layer, the charge generation layer be formed with substantially no binder agent. On the charge generation layer thus provided, a charge transport layer formation liquid comprising as the main component a high-molecular charge transport material for use in the present invention may be coated. In such a way, the azo pigment can sufficiently come in contact with the high-molecular charge transport material. The result is that the sensitivity of the obtained photoconductor is improved.

With respect to the phthalocyanine pigment, it is known that charge generation takes place in the particles of the phthalocyanine pigment, and therefore, the contact area of the phthalocyanine pigment with molecules of the donor material does not affect the generation of charge. When the phthalocyanine pigment is used as the charge generation material in the charge generation layer, there is no necessity to care about the contact between the phthalocyanine pigment and the high-molecular charge transport material. Similar to the conventional photoconductor in which a low-molecular charge transport material is dispersed, the photoconductor of the present invention can be therefore easily fabricated so as to exhibit high sensitivity by using the phthalocyanine pigment as the charge generation material.

In particular, oxotitanyl phthalocyanine is preferable as the charge generation material because it exhibits absorption in the longer wavelengths side. By use of the oxotitanyl phthalocyanine as the charge generation material, it becomes possible to obtain a photoconductor capable of showing high sensitivity with respect to laser diode (LD) with a wavelength of 780 nm which is currently prevalent as the semiconductor laser.

The structure of the azo pigment, and specific examples of the phthalocyanine compound are shown in Japanese Laid-Open Patent Application 9-319113.

The previously mentioned electrophotographic photoconductor may be incorporated in a process cartridge. The photoconductor itself can show high wear resistance and excellent gas resistance as mentioned above, so that repeated use durability of the photoconductor is remarkably improved. Accordingly, the life of the process cartridge can be extended.

When an electrophotographic image forming apparatus is equipped with the electrophotographic photoconductor of the present invention, the life of the photoconductor can be extended, and high quality images can be produced for an extended period of time with minimum maintenance of the photoconductor.

The aforementioned process cartridge holding the electrophotographic photoconductor therein may be detachably set in the electrophotographic image forming apparatus. Even if the process cartridge does not function, the image forming operation can be readily resumed immediately after easy replacement for a new process cartridge.

The electrophotographic image forming apparatus and the process cartridge according to the present invention will now be explained in detail with reference to FIG. 1 to FIG. 3.

FIG. 1 is a schematic view which shows an example of the image forming apparatus employing the electrophotographic photoconductor according to the present invention.

An electrophotographic photoconductor 1 in the form of a drum comprises an electroconductive support, and a photoconductive layer formed thereon comprising a charge generation layer and a charge transport layer which are successively overlaid on the electroconductive support in this order.

The photoconductor may be in the form of a drum as shown in FIG. 1, a sheet, or an endless belt.

As shown in FIG. 1, there are disposed a charger 3, an eraser 4, a light exposing unit 5, a development unit 6, a pre-transfer charger 7, an image transfer charger 10, a separating charger 11, a separator 12, a pre-cleaning charger 13, a fur brush 14, a cleaning blade 15, and a quenching lamp 2 around the drum-shaped electrophotographic photoconductor 1.

In FIG. 1, reference numeral 8 indicates resist rollers.

The charger 3, the pre-transfer charger 7, the image transfer charger 10, the separating charger 11, and the pre-cleaning charger 13 may employ the conventional means such as a corotron charger, a scorotron charger, a solid state charger, and a charging roller. Any chargers as mentioned above can be used as the means for charging the photoconductor. In particular, it is effective to employ both the image transfer charger 10 and the separating charger 11 as illustrated in FIG. 1.

As the light source of the light exposing unit 5, a semiconductor laser beam with a wavelength of 600 to 800 nm can be preferably employed. As the light source for the quenching lamp 2, there can be employed, for example, a fluorescent tube, tungsten lamp, halogen lamp, mercury vapor lamp, sodium light source, light emitting diode (LED), semiconductor laser (LD), and electroluminescence (EL). Further, a desired wavelength can be obtained by use of various filters such as a sharp-cut filter, bandpass filter, a near infrared cut filter, dichroic filter, interference filter, and color conversion filter.

The photoconductor may be irradiated with light in the course of the image transfer step, quenching step, cleaning step, or pre-light exposure step. In such a case, the above-mentioned light sources are usable.

The toner image formed on the photoconductor 1 using the development unit 6 is transferred to a transfer sheet 9. At the step of image transfer, all the toner particles deposited on the photoconductor 1 are not transferred to the transfer sheet 9. Some toner particles remain on the surface of the photoconductor 1. The remaining toner particles are removed from the photoconductor 1 using the fur brush 14 and the cleaning blade 15. The cleaning of the photoconductor may be carried out only by use of a cleaning brush. As the cleaning brush, there can be employed a conventional fur brush and magnetic fur brush.

When the photoconductor 1 is positively charged, and exposed to light images, positively-charged electrostatic latent images are formed on the photoconductor. In the similar manner as in above, when a negatively charged photoconductor is exposed to light images, negative electrostatic latent images are formed. A negatively-chargeable toner and a positively-chargeable toner are respectively used for development of the positive electrostatic images and the negative electrostatic simages, thereby obtaining positive images. In contrast to this, when the positive electrostatic images and the negative electrostatic images are respectively developed using a positively-chargeable toner and a negatively-chargeable toner, negative images can be obtained on the surface of the photoconductor 1. Not only such development means, but also the quenching means may employ the conventional manner.

Figure 2:
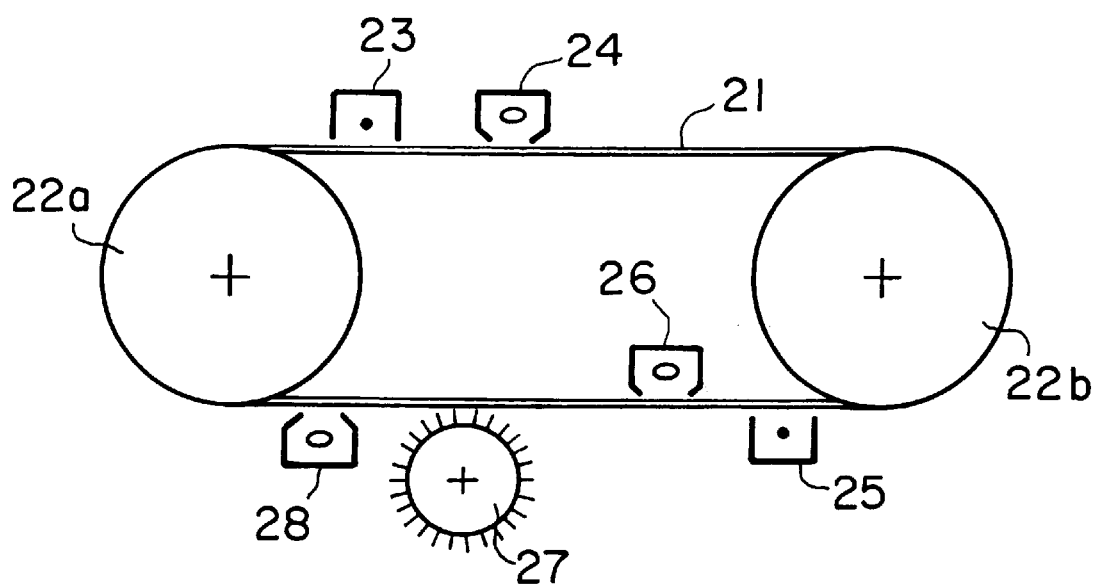
FIG. 2 is a schematic view which shows another example of an electrophotographic image forming apparatus according to the present invention.

FIG. 2 is a schematic view which shows another example of the electrophotographic image forming apparatus according to the present invention.

A photoconductor 21 shown in FIG. 2, which comprises an electroconductive support and the previously mentioned photoconductive layer formed thereon, is driven by driving rollers 22a and 22b. Charging of the photoconductor 21 is carried out by use of a charger 23, and the charged photoconductor 21 is exposed to light images using an image exposure light 24. Thereafter, latent electrostatic images formed on the photoconductor 21 are developed to toner images using a development unit (not shown), and the toner images are transferred to a transfer sheet with the aid of a transfer charger 25. After the toner images are transferred to the transfer sheet, the photoconductor 21 is subjected to pre-cleaning light exposure using a pre-cleaning light 26, and physically cleaned by use of a cleaning brush 27. Finally, quenching is carried out using a quenching lamp 28. In FIG. 2, the electroconductive support of the photoconductor 21 has light transmission properties, so that it is possible to apply the pre-cleaning light 26 to the electroconductive support side of the photoconductor 21. As a matter of course, the photoconductive layer side of the photoconductor 21 may be exposed to the pre-cleaning light. Similarly, the image exposure light 24 and the quenching lamp 28 may be disposed so that light is directed toward the electroconductive support side of the photoconductor 21.

The photoconductor 21 is exposed to light using the image exposure light 24, pre-cleaning light 26, and the quenching lamp 28, as illustrated in FIG. 2. In addition to the above, light exposure may be carried out before image transfer, and before image exposure.

The above-discussed units, such as the charging unit, light-exposing unit, development unit, image transfer unit, cleaning unit, and quenching unit may be independently fixed in the copying machine, facsimile machine, or printer. Alternatively, at least one of those units may be incorporated in the process cartridge together with the photoconductor. To be more specific, the process cartridge holding therein the photoconductor, and at least one of the charging unit, light-exposing unit, development unit, image transfer unit, cleaning unit, and quenching unit may by detachably set in the above-mentioned electrophotographic image forming apparatus.

Figure 3:
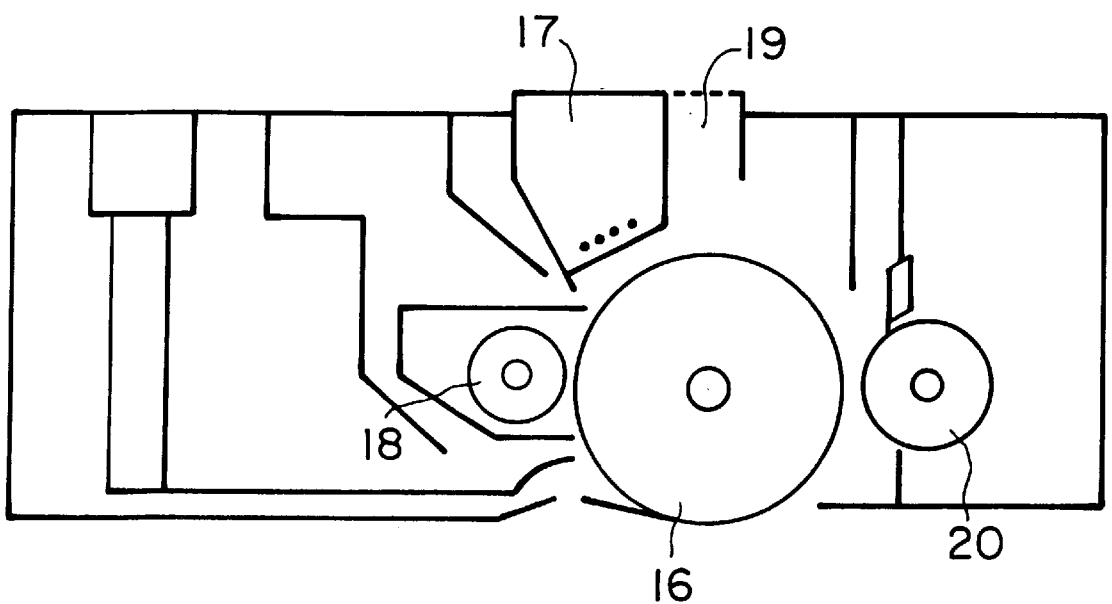
FIG. 3 is a schematic view which shows an example of a process cartridge holding the photoconductor therein according to the present invention.

FIG. 3 is a schematic view which shows one example of the process cartridge according to the present invention. In this embodiment of FIG. 3, there are disposed a charger 17, a light exposing unit 19, a development roller 20, and a cleaning brush 18 around a photoconductor 16 comprising an electroconductive support, and a charge generation layer and a charge transfer layer which are successively overlaid on the electroconductive support in this order.

Other features of this invention will become apparent in the course of the following description of exemplary embodiments, which are given for illustration of the invention and are not intended to be limiting thereof.

EXAMPLE 1

[(Fabrication of Photoconductor No. 1]
(Formation of Undercoat Layer)

A commercially available polyamide resin (Trademark "CM-8000", made by Toray Industries, Inc.) was dissolved in a mixed solvent of methanol and butanol, so that a coating liquid for undercoat layer was prepared.

The thus prepared coating liquid was coated on an aluminum plate by a doctor blade, and dried at room temperature, so that an undercoat layer with a thickness of 0.3 μm was provided on the aluminum plate.
(Formation of Charge Generation Layer)

A coating liquid for charge generation layer was prepared by pulverizing and dispersing a bisazo compound of the following formula, serving as a charge generation material, in a mixed solvent of cyclohexanone and 2-butanone using a ball mill. The thus obtained coating liquid was coated on the above prepared undercoat layer by a doctor blade, and dried at room temperature. Thus, a charge generation layer with a thickness of 0.5 μm was formed on the undercoat layer.

[Bisazo Compound]

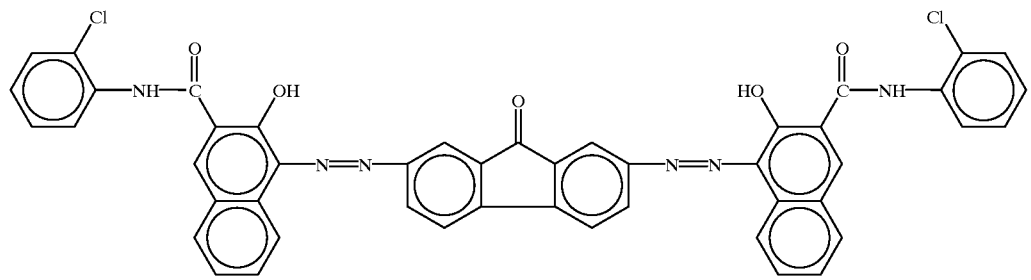

(Formation of Charge Transport Layer)

A polycarbonate resin No. 1 serving as a high-molecular charge transport material, shown in TABLE 1, was dissolved in dichloromethane. The ionization potential of the bisphenol monomer (a) used for the synthesis of the polycarbonate resin No. 1 was 5.36 eV. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, are electrophotographic photoconductor No. 1 according to the present invention was fabricated.

EXAMPLES 2 to 11

The procedure for fabrication of the electrophotographic photoconductor No. 1 in Example 1 was repeated except that the polycarbonate resin No. 1 for use in the charge transport layer coating liquid in Example 1 was replaced by each of polycarbonate resins Nos. 2 to 11 as illustrated in TABLE 1. The ionization potential of the bisphenol monomer (a) used for the synthesis of any polycarbonate resins was 5.36 eV.

Thus, electrophotographic photoconductors No. 2 to No. 11 according to the present invention were fabricated.

COMPARATIVE EXAMPLES 1 to 7

The procedure for fabrication of the electrophotographic photoconductor No. 1 in Example 1 was repeated except that the polycarbonate resin No. 1 for use in the charge transport layer coating liquid in Example 1 was replaced by each of polycarbonate resins Nos. 12 to 18 as illustrated in TABLE 1. The ionization potential of the bisphenol monomer (a) used for the synthesis of any polycarbonate resins was 5.36 eV.

Thus, comparative electrophotographic photoconductors No. 1 to No. 7 were fabricated.

EXAMPLES 12 to 14

The procedure for fabrication of the electrophotographic photoconductor No. 1 in Example 1 was repeated except that the polycarbonate resin No. 1 for use in the charge transport layer coating liquid in Example 1 was replaced by each of polycarbonate resins Nos. 19 to 21 as illustrated in TABLE 1. The ionization potential of the bisphenol monomer (a) used for the synthesis of any polycarbonate resins was 5.36 eV.

Thus, electrophotographic photoconductors No. 12 to No. 14 according to the present invention were fabricated.

TABLE 1
| Resin No. | Structure of Polycarbonate Resin | Mn(*) | Mw(**) |
|---|---|---|---|
| 1 | 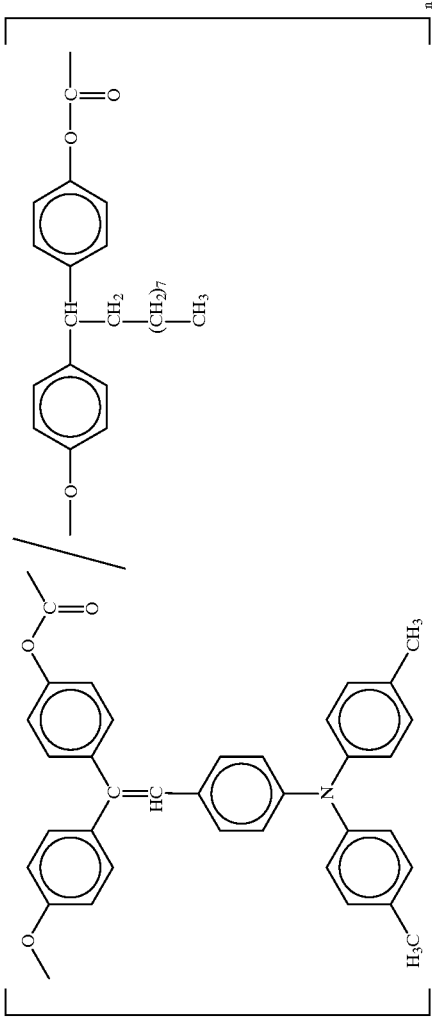 | 31900 | 129300 |
| 2 | 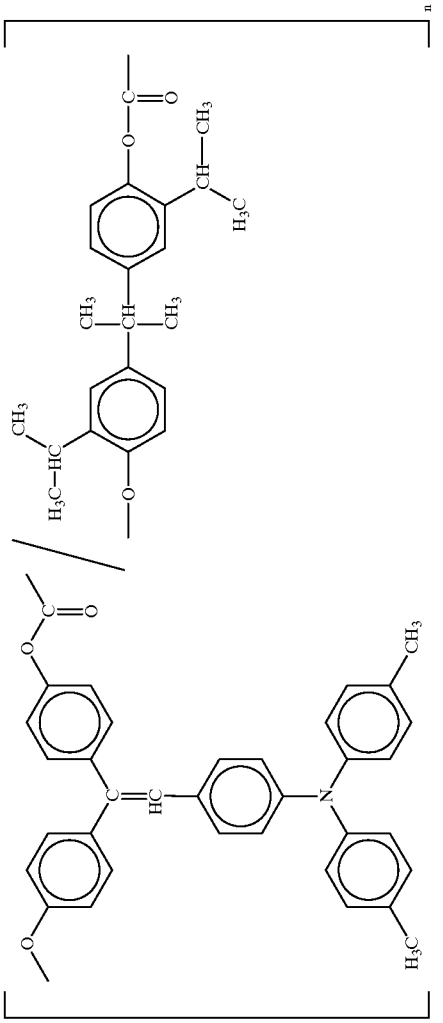 | 36300 | 106400 |

TABLE 1-continued

Structure of Polycarbonate Resin

| Resin No. | Structure | Mn(*) | Mw(**) |
|---|---|---|---|
| 3 | (0.525:0.475) | 49300 | 166600 |
| 4 | (0.49:0.51) | 36100 | 111400 |

TABLE 1-continued

| Resin No. | Structure of Polycarbonate Resin | Mn(*) | Mw(**) |
|---|---|---|---|
| 5 | (structure with bisphenol-type unit bearing p-methoxyphenyl, p-tolyl groups and N(p-tolyl)₂ amine, copolymerized with a bisphenol unit having CH(CH₂CH₃)(CH₃) substituents; ratio 0.496:0.504) | 47100 | 261600 |
| 6 | (structure with bisphenol-type unit bearing p-methoxyphenyl, p-tolyl groups and N(p-tolyl)₂ amine, copolymerized with a bisphenol unit having cyclohexyl substituents; ratio 0.518:0.482) | 21100 | 46900 |

TABLE 1-continued
| Resin No. | Structure of Polycarbonate Resin | Mn(*) | Mw(**) |
|---|---|---|---|
| 7 | 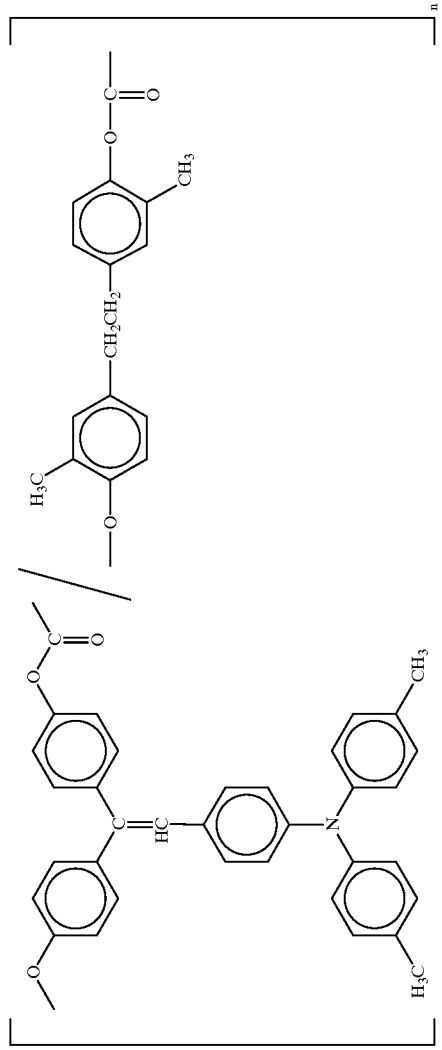 (0.466:0.534) | 76200 | 306000 |
| 8 | 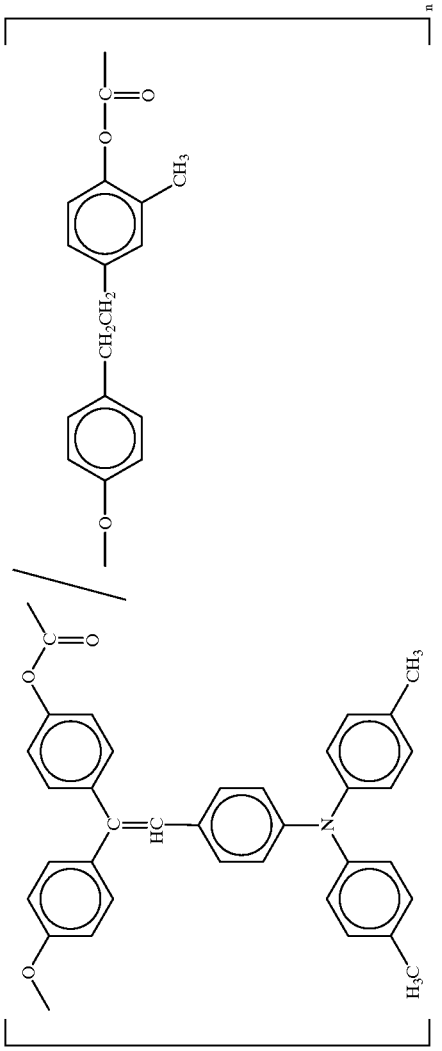 (0.477:0.523) | 58800 | 178100 |

TABLE 1-continued
| Resin No. | Structure of Polycarbonate Resin | Mn(*) | Mw(**) |
|---|---|---|---|
| 9 | 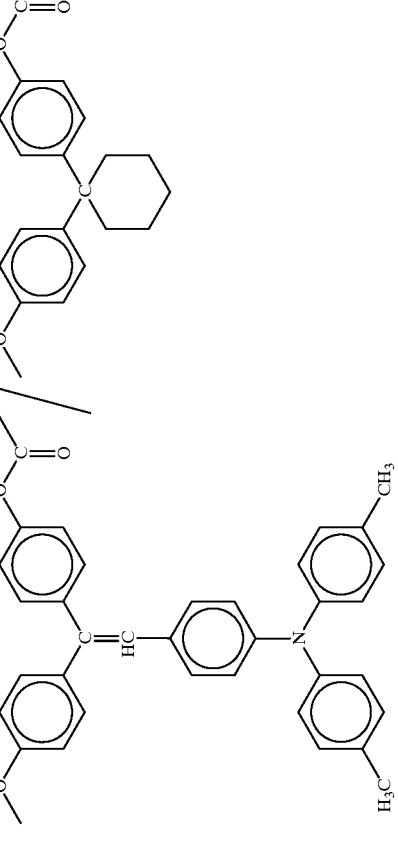 (0.453:0.547) | 102100 | 208500 |
| 10 | 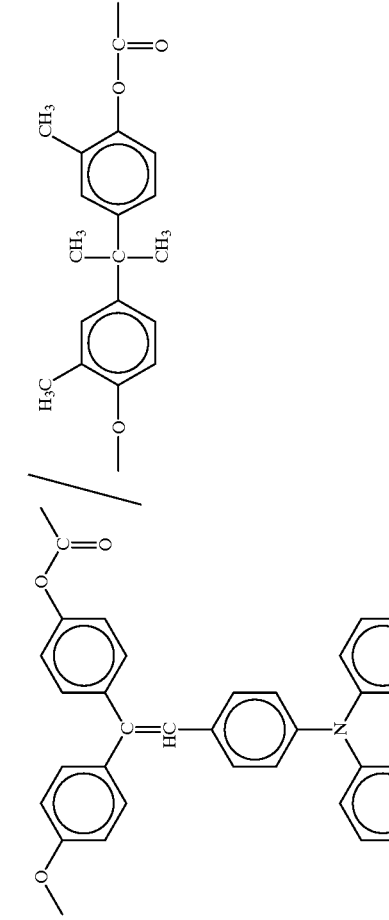 (0.42:0.58) | 45100 | 128400 |

TABLE 1-continued

| Resin No. | Structure of Polycarbonate Resin | Mn(*) | Mw(**) |
|---|---|---|---|
| 11 | [structure with (0.408:0.592)] | 49100 | 139800 |
| 12 | [structure with (0.39:0.61)] | 47300 | 139000 |

TABLE 1-continued

| Resin No. | Structure of Polycarbonate Resin | Mn(*) | Mw(**) |
|---|---|---|---|
| 13 | [structure with triarylamine group and difluoro-methoxy bisphenol carbonate unit] (0.522:0.478) | 50100 | 130900 |
| 14 | [structure with triarylamine group and cyclohexylidene bisphenol carbonate unit] (0.43:0.57) | 47600 | 138500 |

TABLE 1-continued

| Resin No. | Structure of Polycarbonate Resin | Mn(*) | Mw(**) |
|---|---|---|---|
| 15 | (structure with triarylamine unit and bisphenol-cyclopentyl carbonate unit, ratio 0.495:0.505) | 57000 | 170700 |
| 16 | (structure with triarylamine unit and bis(methoxyphenyl)methane carbonate unit, ratio 0.367:0.633) | 46900 | 109000 |

TABLE 1-continued
| Resin No. | Structure of Polycarbonate Resin | Mn(*) | Mw(**) |
|---|---|---|---|
| 17 | 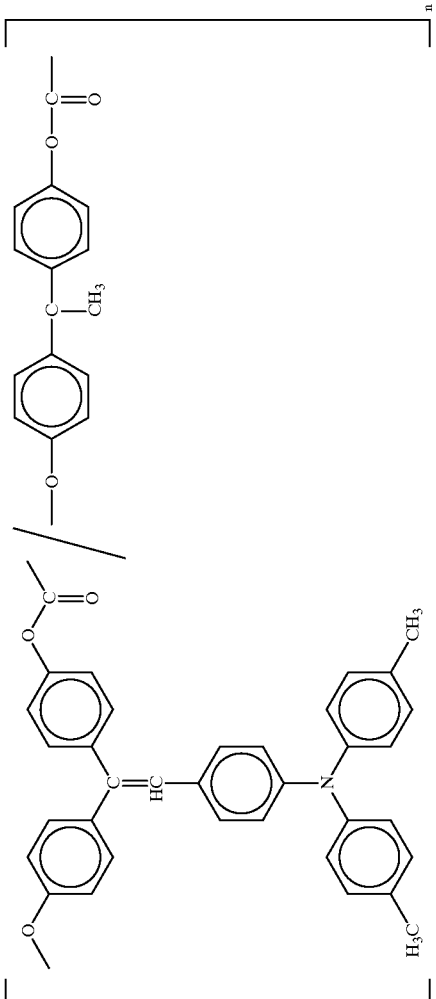 (0.381:0.619) | 60400 | 141600 |
| 18 | 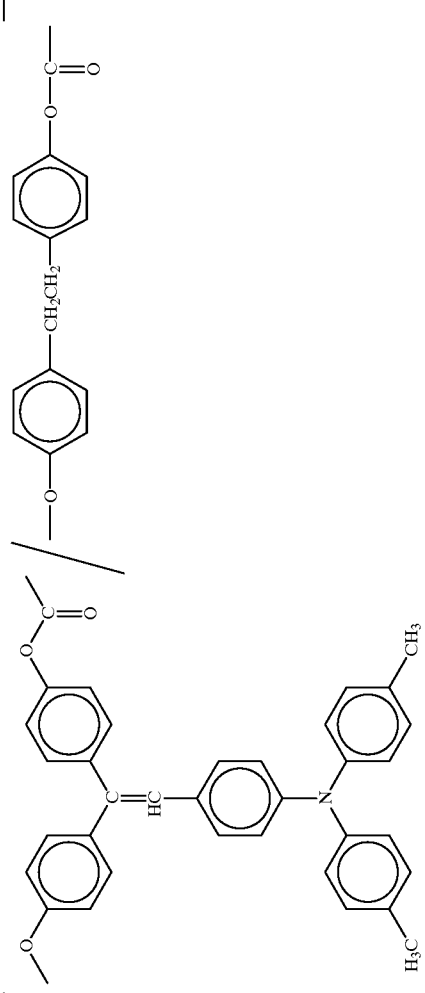 (0.475:0.525) | 64100 | 189300 |

TABLE 1-continued
Structure of Polycarbonate Resin
| Resin No. | Structure of Polycarbonate Resin | Mn(*) | Mw(**) |
|---|---|---|---|
| 19 | 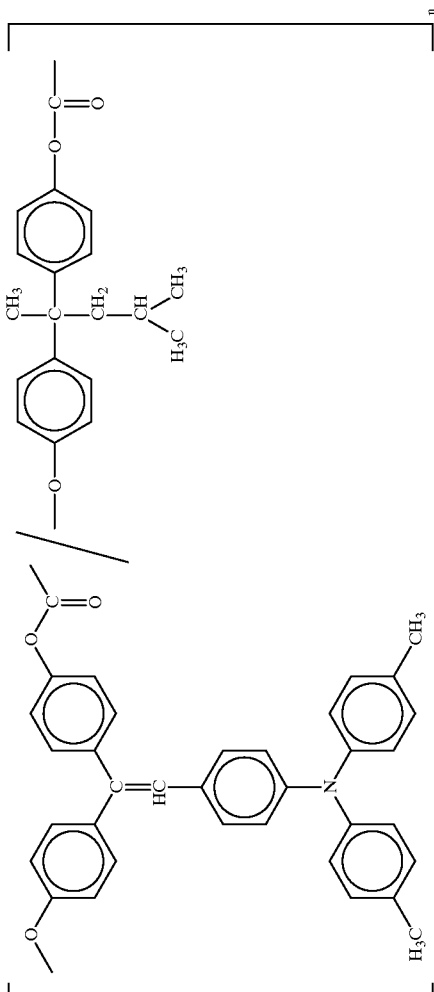 (0.43:0.57) | 46800 | 147900 |
| 20 | 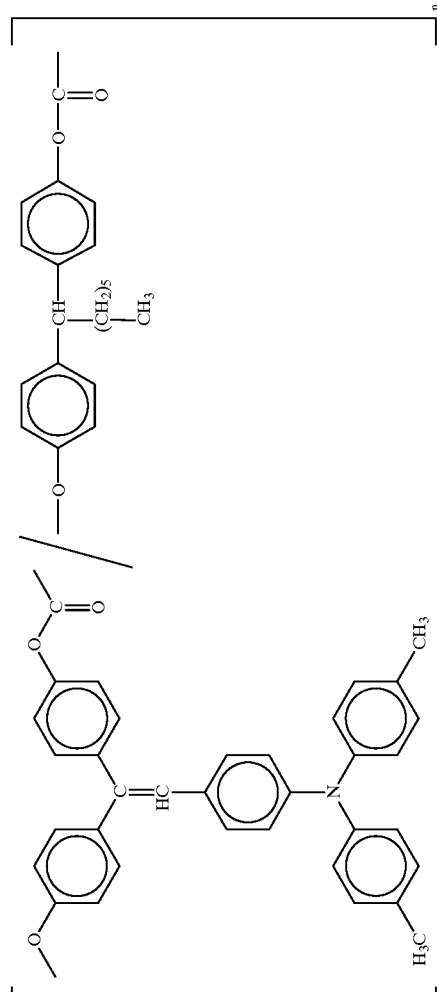 (0.45:0.55) | 34100 | 111200 |

TABLE 1-continued
Structure of Polycarbonate Resin
| Resin No. | Structure of Polycarbonate Resin | Mn(*) | Mw(**) |
|---|---|---|---|
| 21 | 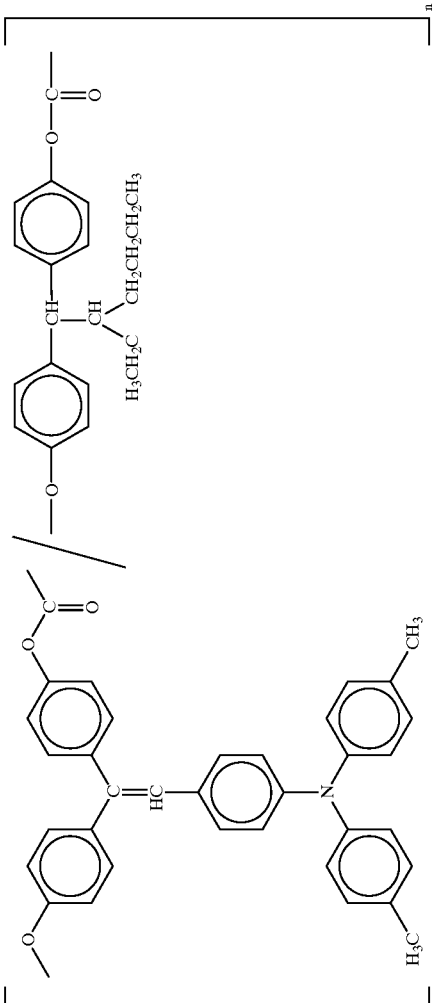 | 40400 | 170600 |
(*)Mn: Number-average molecular weight
(**)Mw: Weight-average molecular weight The gas resistance of each of the above-mentioned photoconductors was evaluated by the following method.

Each of the electrophotographic photoconductors No. 1 to No. 14 according to the present invention respectively fabricated in Examples 1 to 14, and comparative electrophotographic photoconductors No. 1 to No. 7 respectively fabricated in Comparative Examples 1 to 7 was charged negatively in the dark under application of −5 kV of corona charge for 30 seconds, using a commercially available electrostatic copying sheet testing apparatus ("Paper Analyzer Model EPA8100" made by Kawaguchi Electro Works Co., Ltd.) in a dynamic mode. Then, the surface potential (Vm) of each photoconductor was measured.

Apart from the above, each photoconductor was exposed to NOx gases for 100 hours, with the concentration of NO being set to 40 ppm and that of $NO_2$ being set to 10 ppm. After exposed to NOx gases, each photoconductor was negatively charged in the same manner as mentioned above, and the surface potential (Vm') was obtained.

The gas resistance of the photoconductor was expressed by the charging potential retaining ratio in accordance with the following formula:

Charging Potential Retaining Ratio (%)=(Vm')/(Vm)×100

The results are shown in TABLE 2.

TABLE 2

|  | Polycarbonate Resin No. | Vm (−V) | Vm' (−V) | Charging Potential Retaining Ratio (%) |
|---|---|---|---|---|
| Ex. 1 | 1 | 1021 | 876 | 85.8 |
| Ex. 2 | 2 | 1563 | 1440 | 92.1 |
| Ex. 3 | 3 | 1443 | 1125 | 78.0 |
| Ex. 4 | 4 | 1405 | 1302 | 92.7 |
| Ex. 5 | 5 | 1604 | 1367 | 85.2 |
| Ex. 6 | 6 | 1524 | 1395 | 91.5 |
| Ex. 7 | 7 | 1384 | 1092 | 78.9 |
| Ex. 8 | 8 | 1321 | 983 | 74.4 |
| Ex. 9 | 9 | 1620 | 1301 | 80.3 |
| Ex. 10 | 10 | 1557 | 1271 | 81.6 |
| Ex. 11 | 11 | 1606 | 1312 | 81.7 |
| Ex. 12 | 19 | 1501 | 1277 | 85.1 |
| Ex. 13 | 20 | 1550 | 1311 | 84.6 |
| Ex. 14 | 21 | 1490 | 1286 | 86.3 |
| Comp. Ex. 1 | 12 | 1588 | 1048 | 66.0 |
| Comp. Ex. 2 | 13 | 1452 | 760 | 52.3 |
| Comp. Ex. 3 | 14 | 1475 | 1034 | 70.1 |
| Comp. Ex. 4 | 15 | 1450 | 28 | 1.9 |
| Comp. Ex. 5 | 16 | 1537 | 724 | 47.1 |
| Comp. Ex. 6 | 17 | 1605 | 1095 | 68.2 |
| Comp. Ex. 7 | 18 | 1378 | 414 | 30.0 |

As is apparent from the results shown in TABLE 2, the charging potential retaining ratio is higher in the photoconductors according to the present invention than in the comparative photoconducters. This indicates the improvement in gas resistance.

EXAMPLE 15

[Fabrication of Photoconductor No. 15]
(Formation of Undercoat Layer)

A coating liquid with the following formulation was coated on the outer surface of an aluminum drum with a diameter of 30 mm, and dried. Thus, an undercoat layer with a thickness of about 3.5 μm was provided on the aluminum drum.

|  | Parts by Weight |
|---|---|
| Alkyd resin (Trademark "Beckosol 1307-60-EL", made by Dainippon Ink & Chemicals, Incorporated) | 6 |
| Melamine resin (Trademark "Super Beckamine G-821-60", made by Dianippon Ink & Chemicals, Incorporated) | 4 |
| Titanium dioxide | 40 |
| Methyl ethyl ketone | 50 |

[Formation of Charge Generation Layer]

A coating liquid with the following formulation was coated on the above prepared undercoat layer, and dried. Thus, a charge generation layer with a thickness of about 0.3 μm was provided on the undercoat layer.

|  | Parts by Weight |
|---|---|
| Oxotitanium phthalocyanine pigment (charge generation material) | 3 |
| Poly(vinyl butyral) (Trademark "XYHL", made by Union Carbide Japan K.K.) | 2 |
| Tetrahydrofuran | 120 |

[Formation of Charge Transport Layer]

A coating liquid with the following formulation was coated on the above prepared charge generation layer, and dried. Thus, a charge transport layer with a thickness of about 20 μm was provided on the charge generation layer.

|  | Parts by Weight |
|---|---|
| Polycarbonate resin No.1 shown in TABLE 1 (high-molecular charge transport material) | 9 |
| Methylene chloride | 65 |

Thus, an electrophotographic photoconductor No. 15 according to the present invention was fabricated.

EXAMPLES 16 to 20

The procedure for fabrication of the electrophotographic photoconductor No. 15 in Example 15 was repeated except that the polycarbonate resin No. 1 for use in the charge transport layer coating liquid in Example 15 was replaced by each of polycarbonate resins Nos. 2, 4, 5, 7, and 10 as illustrated in TABLE 1, respectively in Examples 16, 17, 18, 19, and 20.

Thus, electrophotographic photoconductors No. 16 to No. 20 according to the present invention were fabricated.

COMPARATIVE EXAMPLE 8

The procedure for fabrication of the electrophotographic photoconductor No. 15 in Example 15 was repeated except that the formulation for the charge transport layer coating liquid in Example 15 was changed to the following formulation:

|  | Parts by weight |
|---|---|
| Bisphenol A type polycarbonate with the following formula: (Trademark "Panlite C1400", made by Teijin Chemicals Ltd.) | 10 |

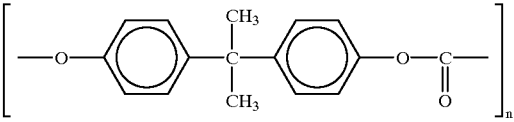

|  |  |
|---|---|
| Low-molecular charge transport material with the following formula: | 10 |

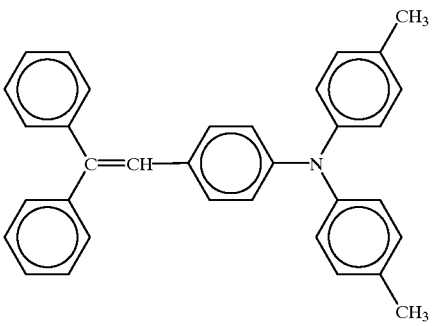

| Methylene chloride | 100 |
|---|---|

Thus, a comparative electrophotographic photoconductor No. 8 was fabricated.

COMPARATIVE EXAMPLE 9

The procedure for fabrication of the comparative electrophotographic photoconductor No. 8 in Comparative Example 8 was repeated except that the bisphenol A type polycarbonate serving as a binder agent for use in the charge transport layer coating liquid in Comparative Example 8 was replaced by a bisphenol C type polycarbonate resin with the following formula, having a weight-average molecular weight of 66700 and a glass transition temperature of 126.8° C.

(Bisphenol C Polycarbonate Resin)

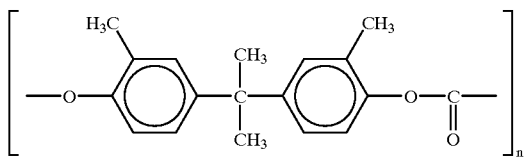

Thus, a comparative electrophotographic photoconductor No. 9 was fabricated.

COMPARATIVE EXAMPLES 10 and 11

The procedure for fabrication of the electrophotographic photoconductor No. 15 in Example 15 was repeated except that the polycarbonate resin No. 1 for use in the charge transport layer coating liquid in Example 15 was replaced by each of polycarbonate resins Nos. 12 and 18 as illustrated in TABLE 1, respectively in Comparative Examples 10 and 11.

Thus, comparative electrophotographic photoconductors No. 10 and No. 11 were fabricated.

Then, each of the electrophotographic photoconductors Nos. 15 to 20 according to the present invention and the comparative electrophotographic photoconductors Nos. 8 to 11 was set in a commercially available copying machine "imagio MF200" (Trademark), made by Ricoh Company, Ltd. A copying test was carried out in such a manner that the charging potential of the photoconductor was set to −850 V, and 50,000 copies were continuously made. After making of 50,000 copies, the charging potential ($Vd_{50000}$) was measured and the abrasion wear of the charge transport layer was also measured. The results are shown in TABLE 3.

The image evaluation was carried out at the final stage of the copying test. The evaluation results are also shown in TABLE 3.

TABLE 3

| | Polycarbonate Resin No. | $Vd_{50000}$ (−V) | Abrasion Wear (μm) | Evaluation of Obtained Images |
|---|---|---|---|---|
| Ex. 15 | 1 | 820 | 2.14 | Excellent |
| Ex. 16 | 2 | 810 | 2.45 | Excellent |
| Ex. 17 | 4 | 780 | 2.15 | Excellent |
| Ex. 18 | 5 | 790 | 2.55 | Excellent |
| Ex. 19 | 7 | 720 | 1.96 | Excellent |
| Ex. 20 | 10 | 790 | 2.20 | Excellent |
| Comp. Ex. 8 | — | 520 | 7.65 | Toner deposition on background Occurrence of black stripes |

TABLE 3-continued

| Poly-carbonate Resin No. | $Vd_{50000}$ (−V) | Abrasion Wear (μm) | Evaluation of Obtained Images |
|---|---|---|---|
| Comp. Ex. 9 | — | 590 | 6.70 | Toner deposition on background Occurrence of black stripes |
| Comp. Ex. 10 | 12 | 675 | 2.65 | Toner deposition on background |
| Comp. Ex. 11 | 18 | 380 | 2.75 | Toner deposition on background |

REFERENCE EXAMPLES 1 to 5

The procedure for fabrication of the electrophotographic photoconductors Nos. 1 to 5 in Examples 1 to 15 was independently repeated except that the charge generation layer coating liquid was prepared by mixing the same bisazo compound as employed in Examples 1 to 5 with a poly(vinyl butyral) resin (Trademark "XYHL", made by Union Carbide Japan K.K.) at a mixing ratio by weight of 1:1. Thus, electrophotographic photoconductors were fabricated for reference.

Each of the electrophotographic photoconductors No. 1 to No. 5 according to the present invention fabricated in Examples 1 to 5 and the electrophotographic photoconductors fabricated in Reference Examples 1 to 5 was charged negatively in the dark under application of −5 kV of corona charge for 30 seconds, using a commercially available electrostatic copying sheet testing apparatus ("Paper Analyzer Model EPA8100" made by Kawaguchi Electro Works Co., Ltd.).

Then, each electrophotographic photoconductor was allowed to stand in the dark without applying any charge thereto until the surface potential of the photoconductor reached −800 V. At that time, each photoconductor was illuminated by a tungsten lamp in such a manner that the illuminance on the illuminated surface of the photoconductor was 4.5 lux, and the exposure $E_{1/2}$ (lux·sec) required to reduce the initial surface potential (−800 V) to ½ the initial surface potential (−400 V) was measured. Furthermore, after each photoconductor was exposed to the tungsten lamp for 30 seconds, the surface potential ($V_{30}$) was measured. The results are shown in TABLE 4.

TABLE 4

| Polycarbonate Resin No. | $E_{1/2}$ (lux · sec) | $V_{30}$ (−V) |
|---|---|---|
| Ex. 1 | 1 | 0.88 | 0 |
| Ex. 2 | 2 | 0.84 | 1 |
| Ex. 3 | 3 | 0.84 | 3 |
| Ex. 4 | 4 | 0.90 | 4 |
| Ex. 5 | 5 | 0.85 | 1 |
| Ref. Ex. 1 | 1 | 1.35 | 17 |
| Ref. Ex. 2 | 2 | 1.33 | 11 |
| Ref. Ex. 3 | 3 | 1.30 | 13 |
| Ref. Ex. 4 | 4 | 1.37 | 15 |
| Ref. Ex. 5 | 5 | 1.32 | 11 |

As can be seen from the results of TABLE 4, when the azo pigment is used as the charge generation material in the charge generation layer, the sensitivity becomes higher and the light decay proceeds more smoothly by using a charge generation layer coating liquid which consists of the azo pigment, with no binder resin.

EXAMPLE 21

[Fabrication of Photoconductor No. 21]
(Formation of Undercoat Layer)

A coating liquid with the following formulation was coated on an aluminum plate, and dried. Thus, an undercoat layer with a thickness of 3.5 μm was provided on the aluminum plate.

| | Parts by Weight |
|---|---|
| Alkyd resin (Trademark "Beckosol 1307-60-EL", made by Dainippon Ink & Chemicals, Incorporated) | 6 |
| Melamine resin (Trademark "Super Beckamine G-821-60", made by Dainippon Ink & Chemicals, Incorporated) | 4 |
| Titanium dioxide | 40 |
| Methyl ethyl ketone | 200 |

[Formation of Charge Generation Layer]

A coating liquid with the following formulation was coated on the above prepared undercoat layer, and dried. Thus, a charge generation layer with a thickness of 0.3 μm was provided on the undercoat layer.

| | Parts by Weight |
|---|---|
| Oxotitanium phthalocyanine pigment (charge generation material) | 3 |
| Poly(vinyl butyral) (Trademark "XYHL", made by Union Carbide Japan K.K.) | 2 |
| Tetrahydrofuran | 333 |

[Formation of Charge Transport Layer]

A polycarbonate resin No. 1 serving as a charge transport material, shown in TABLE 1, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 21 according to the present invention was fabricated.

EXAMPLES 22 to 25

The procedure for fabrication of the electrophotographic photoconductor No. 21 in Example 21 was repeated except that the polycarbonate resin No. 1 for use in the charge transport layer coating liquid in Example 21 was replaced by each of polycarbonate resins Nos. 2, 3, 4, and 5 as illustrated in TABLE 1, respectively in Examples 22, 23, 24, and 25.

Thus, electrophotographic photoconductors No. 22 to No. 25 according to the present invention were fabricated.

Each of the electrophotographic photoconductors No. 21 to No. 25 according to the present invention fabricated in Examples 21 to 25 was charged negatively in the dark under application of −5 kV of corona charge for 30 seconds, using a commercially available electrostatic copying sheet testing apparatus ("Paper Analyzer Model EPA8100" made by Kawaguchi Electro Works Co., Ltd.). Then, each electrophotographic photoconductor was allowed to stand in the dark without applying any charge thereto. When the surface potential of the photoconductor reached −800 V, the photoconductor was illuminated by light of 780 nm with a light intensity of 5 $\mu$W/cm$^2$. In each case, the exposure $E_{1/2}$ ($\mu$J/cm$^2$) required to reduce the initial surface potential (−800 V) to ½ the initial surface potential (−400 V) was measured. Furthermore, the surface potential ($V_{30}$) was measured after the photoconductor was subjected to light exposure for 30 seconds. The results are shown in TABLE 5.

TABLE 5

|  | Polycarbonate Resin No. | $E_{1/2}$ ($\mu$J/cm$^2$) | $V_{30}$ (−V) |
|---|---|---|---|
| Ex. 21 | 1 | 0.15 | 9 |
| Ex. 22 | 2 | 0.14 | 10 |
| Ex. 23 | 3 | 0.14 | 13 |
| Ex. 24 | 4 | 0.15 | 11 |
| Ex. 25 | 5 | 0.15 | 10 |

As is apparent from the results shown in TABLE 5, high sensitivity of the photoconductor can be attained by using oxotitanium phthalocyanine pigment as the charge generation material in combination with the high-molecular polycarbonate for use in the present invention.

Japanese Patent Application No. 11-124415 filed Apr. 30, 1999 and Japanese Patent Application filed Mar. 31, 2000 are hereby incorporated by reference.

What is claimed is:

1. An electrophotographic photoconductor comprising an electroconductive support and a photoconductive layer formed thereon, a surface top portion of said photoconductor comprising a high-molecular charge transport material which comprises a polycarbonate copolymer synthesized from:

(a) a bisphenol monomer with an ionization potential of 6.0 eV or less, having a positive hole transporting function, and (b) a bisphenol monomer comprising a substituent at the opposition with respect to at least one hydroxyl group thereof, the substituent being bulkier than a fluorine atom.

2. An electrophotographic photoconductor comprising an electroconductive support and a photoconductive layer formed thereon, a surface top portion of said photoconductor comprising a high-molecular charge transport material which comprises a polycarbonate copolymer synthesized from:

(a) a bisphenol monomer with an ionization potential of 6.0 eV or less, having a positive hole transporting function, and (c) a bisphenol monomer of formula (1):

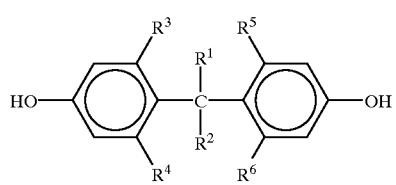

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

3. The electrophotographic photoconductor as claimed in claim 2, wherein the total number of carbon atoms of $R^1$ and $R^2$ is in a range of 4 to 36.

4. The electrophotographic photoconductor as claimed in claim 1, wherein said bisphenol monomer (b) has formula (2):

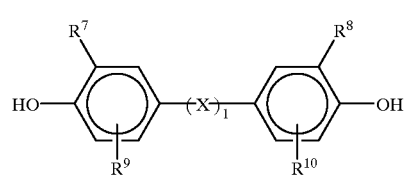

(2)

wherein $R^7$, $R^8$, $R^9$, and $R^{10}$ are each a hydrogen atom, a chlorine atom, a bromine atom, a straight-chain or branched alkyl group having 1 to 6 carbon atoms, a cyclic alkyl group having 5 to 7 carbon atoms, or phenyl group, provided that $R^7$ and $R^8$ are not a hydrogen atom at the same time; and l is an integer of 0 or 1, and when l=1, X is a straight-chain alkylene group having 2 to 12 carbon atoms, a branched alkylene group having 3 to 12 carbon atoms, a bivalent group having at least one alkylene group with 1 to 10 carbon atoms and at least one atom selected from the group consisting of an oxygen atom and a sulfur atom, —C—, —S—, —SO—, —SO$_2$—, —CO—,

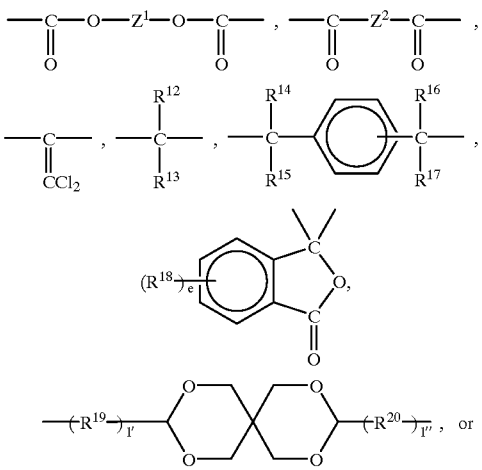

-continued

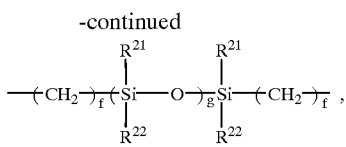

in which $Z^1$ and $Z^2$ are each a substituted or unsubstituted bivalent aliphatic group, or a substituted or unsubstituted arylene group; $R^{12}, R^{13}, R^{14}, R^{15}, R^{16}, R^{17}$ and $R^{18}$ are each independently a hydrogen atom, a halogen atom, a substituted or unsubstituted alkyl group having 1 to 5 carbon atoms, a substituted or unsubstituted alkoxyl group having 1 to 5 carbon atoms, or a substituted or unsubstituted aryl group, and $R^{12}$ and $R^{13}$ may form together a carbon ring or heterocyclic ring having 5 to 12 carbon atoms, or $R^{12}$ and $R^{13}$ may form a carbon ring or heterocyclic ring in combination with $R^8$ and $R^9$; l' and l" are each an integer of 0 or 1, and when l'=1 and l"=1, $R^{19}$ and $R^{20}$ are each an alkylene group having 1 to 4 carbon atoms; $R^{21}$ and $R^{22}$ are each independently a substituted or unsubstituted alkyl group having 1 to 5 carbon atoms or a substituted or unsubstituted aryl group; e is an integer of 0 to 4; f is an integer of 0 to 20; and g is an integer of 0 to 2000.

5. The electrophotographic photoconductor as claimed in claim 4, wherein $R^7$ and $R^8$ in formula (2) are each a straight-chain or branched alkyl group having 3 to 6 carbon atoms, a cyclic alkyl group having 5 to 7 carbon atoms, or phenyl group.

6. The electrophotographic photoconductor as claimed in claim 4, wherein X in formula (2) is ethylene group.

7. The electrophotographic photoconductor as claimed in claim 1, wherein said bisphenol monomer (b) has formula (3):

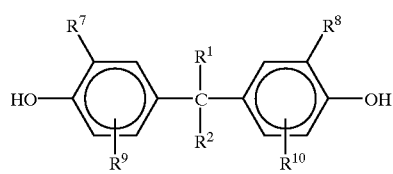

(3)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^7, R^8, R^9,$ and $R^{10}$ are each a hydrogen atom, a chlorine atom, a bromine atom, a straight-chain or branched alkyl group having 1 to 6 carbon atoms, a cyclic alkyl group having 5 to 7 carbon atoms, or phenyl group, provided that $R^7$ and $R^8$ are not a hydrogen atom at the same time.

8. The electrophotographic photoconductor as claimed in claim 7, wherein the total number of carbon atoms of $R^1$ and $R^2$ is in a range of 4 to 36.

9. The electrophotographic photoconductor as claimed in claim 1, wherein said bisphenol monomer (a) has an aromatic tertiary amine structure.

10. The electrophotographic photoconductor as claimed in claim 9, wherein said aromatic tertiary amine structure is a triarylamine structure.

11. The electrophotographic photoconductor as claimed in claim 2, wherein said bisphenol monomer (a) has an aromatic tertiary amine structure.

12. The electrophotographic photoconductor as claimed in claim 11, wherein said aromatic tertiary amine structure is a triarylamine structure.

13. The electrophotographic photoconductor as claimed in claim 1, wherein said photoconductive layer comprises a charge generation layer and a charge transport layer which are successively overlaid on said electroconductive support in this order.

14. The electrophotographic photoconductor as claimed in claim 2, wherein said photoconductive layer comprises a charge generation layer and a charge transport layer which are successively overlaid on said electroconductive support in this order.

15. The electrophotographic photoconductor as claimed in claim 13, wherein said charge generation layer comprises a charge generation material which comprises a phthalocyanine compound.

16. The electrophotograhic photoconductor as claimed in claim 15, wherein said phthalocyanine compound comprises oxotitanium phthalocyanine.

17. The electrophotographic photoconductor as claimed in claim 14, wherein said charge generation layer comprises a charge generation material which comprises a phthalocyanine compound.

18. The electrophotographic photoconductor as claimed in claim 17, wherein said phthalocyanine compound comprises oxotitanium phthalocyanine.

19. The electrophotographic photoconductor as claimed in claim 13, wherein said charge generation layer comprises:
  a charge generation material comprising an azo pigment, and
  a binder resin in an amount of 10 wt. % or less of the total weight of said charge generation layer.

20. The electrophotographic photoconductor as claimed in claim 14, wherein said charge generation layer comprises:
  a charge generation material comprising an azo pigment, and
  a binder resin in an amount of 10 wt. % or less of the total weight of said charge generation layer.

21. A process cartridge which is freely detachable from an electrophotographic image forming apparatus, comprising an electrophotographic photoconductor, and at least one means selected from the group consisting of a charging means, an image exposure means, a developing means, an image transfer means, and a cleaning means,
  said electrophotographic photoconductor comprising an electroconductive support and a photoconductive layer formed thereon, a surface top portion of said photoconductor comprising a high-molecular charge transport material which comprises a polycarbonate copolymer synthesized from:
  (a) a bisphenol monomer with an ionization potential of 6.0 eV or less, having a positive hole transporting function, and
  (b) a bisphenol monomer comprising a substituent at the o-position with respect to at least one hydroxyl group thereof, the substituent being bulkier than a fluorine atom.

22. A process cartridge which is freely detachable from an electrophotographic image forming apparatus, comprising an electrophotographic photoconductor, and at least one means selected from the group consisting of a charging means, an image exposure means, a developing means, an image transfer means, and a cleaning means,
  said electrophotographic photoconductor comprising an electroconductive support and a photoconductive layer formed thereon, a surface top portion of said photoconductor comprising a high-molecular charge transport material which comprises a polycarbonate copolymer synthesized from:

(a) a bisphenol monomer with an ionization potential of 6.0 eV or less, having a positive hole transporting function, and (c) a bisphenol monomer of formula (1):

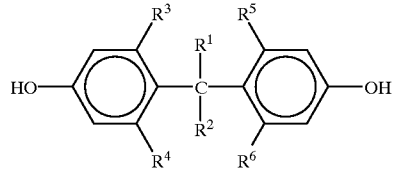

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

23. An electrophotographic image forming apparatus comprising an electrophotographic photoconductor comprising an electroconductive support and a photoconductive layer formed thereon, a surface top portion of said photoconductor comprising a high-molecular charge transport material which comprises a polycarbonate copolymer synthesized from:

(a) a bisphenol monomer with an ionization potential of 6.0 eV or less, having a positive hole transporting function, and (b) a bisphenol monomer comprising a substituent at the o-position with respect to at least one hydroxyl group thereof, the substituent being bulkier than a fluorine atom.

24. An electrophotographic image forming apparatus comprising an electrophotographic photoconductor comprising an electroconductive support and a photoconductive layer formed thereon, a surface top portion of said photoconductor comprising a high-molecular charge transport material which comprises a polycarbonate copolymer synthesized from:

(a) a bisphenol monomer with an ionization potential of 6.0 eV or less, having a positive hole transporting function, and (c) a bisphenol monomer of formula (1);

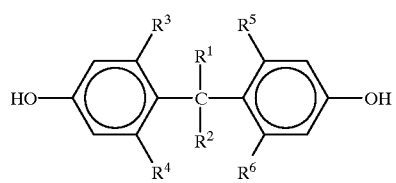

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

25. An electrophotographic image forming apparatus comprising a process cartridge which is freely detachable from said image forming apparatus, and comprises:

at least one means selected from the group consisting of a charging means, an image exposure means, a developing means, an image transfer means, and a cleaning means, and an electrophotographic photoconductor comprising an electroconductive support and a photoconductive layer formed thereon, a surface top portion of said photoconductor comprising a high-molecular charge transport material which comprises a polycarbonate copolymer synthesized from (a) a bisphenol monomer with an ionization potential of 6.0 eV or less, having a positive hole transporting function, and (b) a bisphenol monomer comprising a substituent at the o-position with respect to at least one hydroxyl group thereof, the substituent being bulkier than a fluorine atom.

26. An electrophotographic image forming apparatus comprising a process cartridge which is freely detachable from said image forming apparatus, and comprises:

at least one means selected from the group consisting of a charging means, an image exposure means, a developing means, an image transfer means, and a cleaning means, and an electrophotographic photoconductor comprising an electroconductive support and a photoconductive layer formed thereon, a surface top portion of said photoconductor comprising a high-molecular charge transport material which comprises a polycarbonate copolymer synthesized from (a) a bisphenol monomer with an ionization potential of 6.0 eV or less, having a positive hole transporting function, and (c) a bisphenol monomer of formula (1):

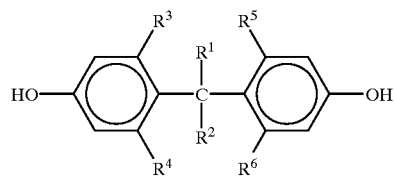

(1)

wherein $R^1$ is a straight-chain or branched alkyl group having 2 to 18 carbon atoms; $R^2$ is a hydrogen atom, a straight-chain or branched alkyl group having 1 to 18 carbon atoms, provided that the total number of carbon atoms of $R^1$ and $R^2$ is 3 or more; and $R^3$, $R^4$, $R^5$, and $R^6$ are each a hydrogen atom, a halogen atom, a straight-chain or branched alkyl group having 1 to 6 carbon atoms, a cyclic alkyl group having 5 to 7 carbon atoms, or phenyl group.

* * * * *

UNITED STATES PATENT AND TRADEMARK OFFICE
CERTIFICATE OF CORRECTION

PATENT NO. : 6,210,848
DATED : April 3, 2001
INVENTOR(S) : Kazukiyo Nagi et al.

It is certified that error appears in the above-identified patent and that said Letters Patent is hereby corrected as shown below:

Column 1,
Line 9, change "photocanductor" to -- photoconductor --;

Column 2,
Line 47, change "9-80172" to -- 9-80772 --;

Column 4,
Line 8, change "opposition" to -- o-position --;

Column 6,
Line 18, change "opposition" to -- o-position --;
Line 20, change "mterials" to -- materials --;
Line 20, delete "a";

Column 7,
Line 18, change "sensitivity-" to -- sensitivity. --;
Line 32, change "Ionization" to -- ionization --;

Column 8,
Line 17, change "$(X)_1$" to -- $(X)_l$ --;
Line 25, insert -- $l$ -- before "is"
Line 26, change "1=," to -- $l=$, --;
Line 50, change "$R^{19})_1\:''$" to -- $R^{19})_l\:'$ -- and "$R^{20})_1\:'''$" to -- $R^{20}_l\:'$ --;

Column 9,
Line 1, change "1 '" to -- $l'$ -- and change "1 ''" to -- $l''$ --;
Line 2, change "1 '" to -- $l'$ -- and change "1 ''" to -- $l''$ --;

Column 13,
Line 9, change "simages" to -- images --;

Column 14,
Line 23, change "[(Fabrication" to -- [Fabrication --;

Column 33,
Table 1, change "C" to -- CH --, above $CH_3$ (at approximately Line 51);

Column 45,
Line 37, after "Application" insert -- No. 12-097520 --;
Line 55, change "opposition" to -- o-position --;

UNITED STATES PATENT AND TRADEMARK OFFICE
CERTIFICATE OF CORRECTION

PATENT NO. : 6,210,848
DATED : April 3, 2001
INVENTOR(S) : Kazukiyo Nagi et al.

It is certified that error appears in the above-identified patent and that said Letters Patent is hereby corrected as shown below:

Column 46,
Line 32, change "$-(X)_1-$" to -- $-(X)_l-$ --;
Line 40, change "1" to -- $l$ --;
Line 41, change "1" to -- $l$ --;
Line 46, change "C" to -- O --;
Line 65, change "$-R^{19}_1-$" to -- $R^{19}_l$ -- and "$R^{20}_1$," to -- $R^{20}_l$ --;

Column 47,
Line 18, change "1'" to -- $l'$ -- and change "1''" to -- $l''$ --;
Line 19, change "1'" to -- $l'$ -- and change "1''" to -- $l''$ --;

Column 49,
Line 49, change ";" to -- : --.

Signed and Sealed this

Twenty-second Day of January, 2002

Attest:

*Attesting Officer*

JAMES E. ROGAN
*Director of the United States Patent and Trademark Office*